United States Patent
Gershman

[11] Patent Number: 5,983,736
[45] Date of Patent: *Nov. 16, 1999

[54] METHOD AND APPARATUS FOR TRACKING THE FLOW OF LIQUIDS IN A GAS PIPE

[75] Inventor: Albert W. Gershman, Matawan, N.J.

[73] Assignee: Brooklyn Union, Brooklyn, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/110,024

[22] Filed: Jul. 2, 1998

[51] Int. Cl.$^6$ ........................................................ G01F 1/00
[52] U.S. Cl. ................................................................ 73/865.8
[58] Field of Search ................................. 73/865.8, 104, 73/861.05, 500; 116/264, 273; 356/241

[56] References Cited

U.S. PATENT DOCUMENTS

| | | | |
|---|---|---|---|
| 3,585,963 | 6/1971 | Hiazpanski | 116/117 |
| 3,995,483 | 12/1976 | Hartong et al. | 73/104 |
| 4,566,313 | 1/1986 | Monten | 73/40 |
| 4,580,442 | 4/1986 | Jones | 73/40 |
| 4,921,374 | 5/1990 | Stutzman | 405/154 |
| 5,043,141 | 8/1991 | Wilson et al. | 422/52 |
| 5,167,867 | 12/1992 | Quaife et al. | 252/408 |
| 5,501,115 | 3/1996 | Kamiyama et al. | 73/865.8 |
| 5,509,375 | 4/1996 | Sayka et al. | 118/712 |
| 5,574,213 | 11/1996 | Shanley | 73/40 |
| 5,583,305 | 12/1996 | Hirsch et al. | 73/865.8 |

FOREIGN PATENT DOCUMENTS

| | | | |
|---|---|---|---|
| 57-196129A | 12/1982 | Japan . | |
| 0075257 | 4/1986 | Japan | 73/865.8 |
| 406094741 | 4/1994 | Japan | 116/264 |
| 807098 | 2/1981 | Russian Federation . | |

*Primary Examiner*—Robert Raevis
*Attorney, Agent, or Firm*—Fitzpatrick, Cella, Harper & Scinto

[57] ABSTRACT

The presence and flow of water or other liquids in pipes, such as gas pipes, is observed by viewing through an opening in the pipe. A colorant liquid which disperses in the liquid is inserted into the pipe and an illuminating element such as an chemiluminescent device is positioned in the pipe at the site of suspected liquid.

34 Claims, 3 Drawing Sheets

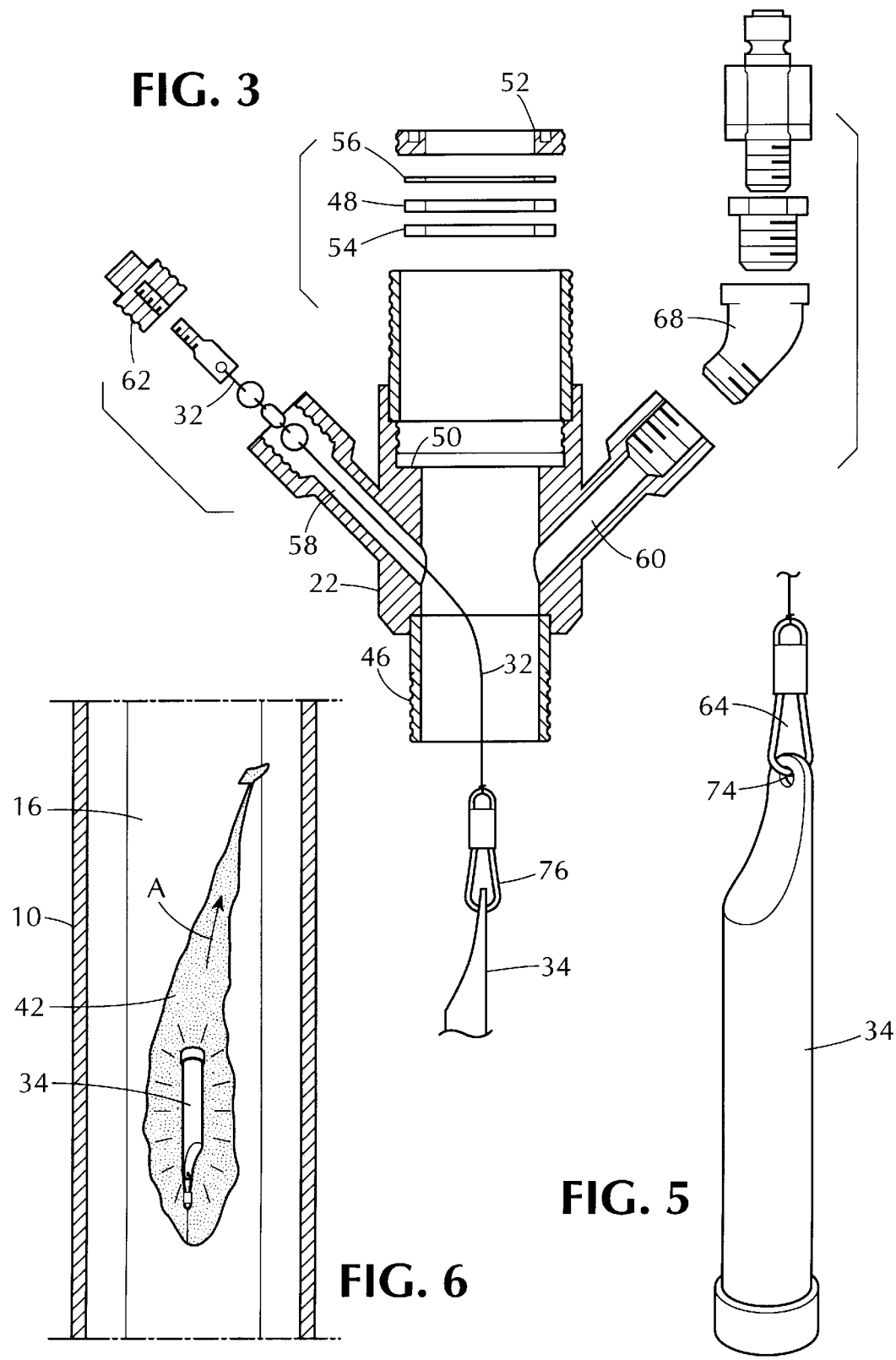

METHOD AND APPARATUS FOR TRACKING THE FLOW OF LIQUIDS IN A GAS PIPE

BACKGROUND OF THE INVENTION

1. Field of the Invention

This invention relates to the tracking of liquid flow in pipelines and more particularly it concerns novel methods and apparatus for ascertaining the presence and direction of flow of water in an in-service gas pipeline.

2. Description of the Related Art

The present invention is particularly useful in the maintenance of gas pipeline supply systems through which combustible gas is delivered to a public utility or from the public utility to its customers.

When floods and water main breaks occur, water may infiltrate into nearby gas distribution piping through cracks or joints in the piping where the pressure of the water is higher than that inside the piping. The presence of water does not in itself cause a problem; but when the infiltration becomes excessive, the water may severely restrict the flow of the gas or even create a complete blockage of gas flow. In order to ascertain the location along the pipeline where infiltration is occurring, it is important not only to be able to detect the presence of water along the pipeline, it is also important to ascertain its direction and flow at a particular location. It is also important, during the operation of detecting the presence and flow of water in a pipeline, not to interrupt the normal flow of gas through the piping.

Prior attempts to detect the flow of water in a gas pipeline have had limited success. Such prior attempts have involved drilling an opening in the wall of the gas pipe and attaching telescope or viewing tube to the opening. A lens was provided within the tube near the opening so that gas would not escape up through the viewing tube. In order to see the water flow inside the gas pipe, lights, such as flashlights were attached to the outer surface of the viewing tube; and fiber optic lines extended from the flashlights down inside the gas pipe to light up its interior. This technique gave poor results because the interface between the flashlights and the fiber optic lines resulted in much of the light being reflected away from the gas pipe. Also, when the water in the pipeline flowed slowly, it was very difficult to ascertain its direction of flow or that it was flowing at all.

The following patents disclose various arrangements for detecting moisture and contaminants in fluids and for detecting leaks in pipes and vessels.

U.S. Pat. No. 3,585,963 discloses a device for detecting the presence of moisture in fluid flowing in a pipe. According to this patent, the fluid contacts a moisture indicating element which is visible through a window in the pipe and which changes color in response to the moisture.

U.S. Pat. No. 5,509,375 discloses a device for detecting the presence of contaminants in fluid being applied to a workpiece. According to this patent, the fluid is supplied through a transparent tube within which an optical fiber extends. The optical fiber illuminates the contaminants which can be viewed through the tube wall.

Japanese Patent No. 57-196129 (A) discloses a means for detecting leaks through a suspected leakage site in a pipeline. An inflatable bag, which is coated on the outside with a material which changes color on contact with water, is positioned at the site and is inflated to press the material against the suspected leakage site. Then, if water is leaking through this site, it will contact the material and change color so that it can be seen when it emerges through the leak.

U.S. Pat. No. 4,921,374 discloses an arrangement for preventing groundwater from leaking into a sewer pipe. According to this arrangement, a water-swellable material which contains a dye is positioned at a suspected leakage point above a sewer line. Water which infiltrates into the line becomes colored by the dye and can be detected downstream of the suspected leakage point.

U.S. Pat. No. 5,167,867 discloses a method of detecting leaks in a pipeline by injecting an odorant into the pipeline and checking for odors downstream of the injection point.

U.S. Pat. No. 5,574,213 discloses an arrangement for testing a vessel for pressure leaks. The arrangement comprises the injection of a fluorescent dye to a fluid being charged into the vessel under pressure. An illumination means illuminates the outside of the vessel and causes any dye which leaks through the vessel wall to fluoresce.

U.S. Pat. No. 4,566,313 discloses an arrangement for detecting the location of a leak in a vessel such as a swimming pool. According to this arrangement, a dye is injected into the pool near a suspected leakage site and the movement of the dye toward the leak is observed.

U.S. Pat. No. 4,580,442 discloses an arrangement for locating air leaks from a fire sprinkling system. According to this arrangement, the normally air filled portion of the system is filled with an aqueous solution of an efficient wetting agent and a water soluble dye. Then, pressure is applied to the system to force the dye through any leaking portions of the sprinkler system.

U.S. Pat. No. 5,043,141 discloses an injection system for forcing a liquid which exhibits chemiluminescent or bioluminescent properties into an observation chamber.

Russian Patent SU-807-098 discloses an arrangement for detecting leaks from an object. The object is filled with an air-ozone mixture and is placed into a transparent sealed chamber which is filled with ethylene. If the air-ozone mixture leaks out from the object, it will react with the ethylene to produce a chemiluminescent effect such as a visible glow.

SUMMARY OF THE INVENTION

The present invention overcomes the problems of the prior art and provides novel methods and apparatus for detecting the presence of water in pipelines. With the present invention it is possible not only to ascertain with certainty the presence of water in a pipeline but also to determine its direction and rate of flow. In this manner the source of the water, i.e. the crack or joint where infiltration is occurring, can be established quickly and with a minimum of difficulty.

According to one aspect, the present invention involves a novel method of inspecting the interior of a pipe. This novel method involves the steps of inserting a light emitting element into a pipe, retaining the light emitting element at given location inside the pipe and observing the interior of the pipe through an opening therein which is aligned with the location of the light emitting element.

According to another aspect, the present involves a novel method of, and apparatus for, ascertaining the presence of liquid at a given location in a pipe. In this aspect, the invention involves the steps of injecting into the pipe, at a given location, a colorant which is dispensable in the liquid and observing the colorant through an opening in the pipe at the given location. The invention also involves a colorant injection system for injecting a dispensable colorant into the pipe at the given location and an observation means which extends through the opening in the pipe.

According to a still further aspect, the invention involves the steps of inserting a light emitting element into a pipe, injecting a dispensable colorant into the pipe at the location of the light emitting element so that said light emitting element illuminates the colorant and observing the colorant as it is dispersed by the liquid in the pipe. The invention also involves a viewing tube which has a viewing end and a pipe connecting end which is insertable through the wall of a pipe, an illuminating element which is suspended from the pipe connecting end of the viewing tube; and a colorant injection system for injecting a dispensable colorant into the pipe at the location of the illuminating element.

There have thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

A specific embodiment has been chosen for purposes of explanation and illustration and is shown in the accompanying drawings in which:

FIG. 3 is an exploded view of the connecting end of the pipe inspecting apparatus of FIG. 2;

FIG. 5 is a perspective view of an illuminating element used in the pipe inspecting apparatus of FIG. 1; and FIG. 6 is a view taken along line 6—6 of FIG. 2 and showing the operation of the illuminating element of FIG. 5.

DETAILED DESCRIPTION OF THE PREFERRED EMBODIMENT

Figure 1:
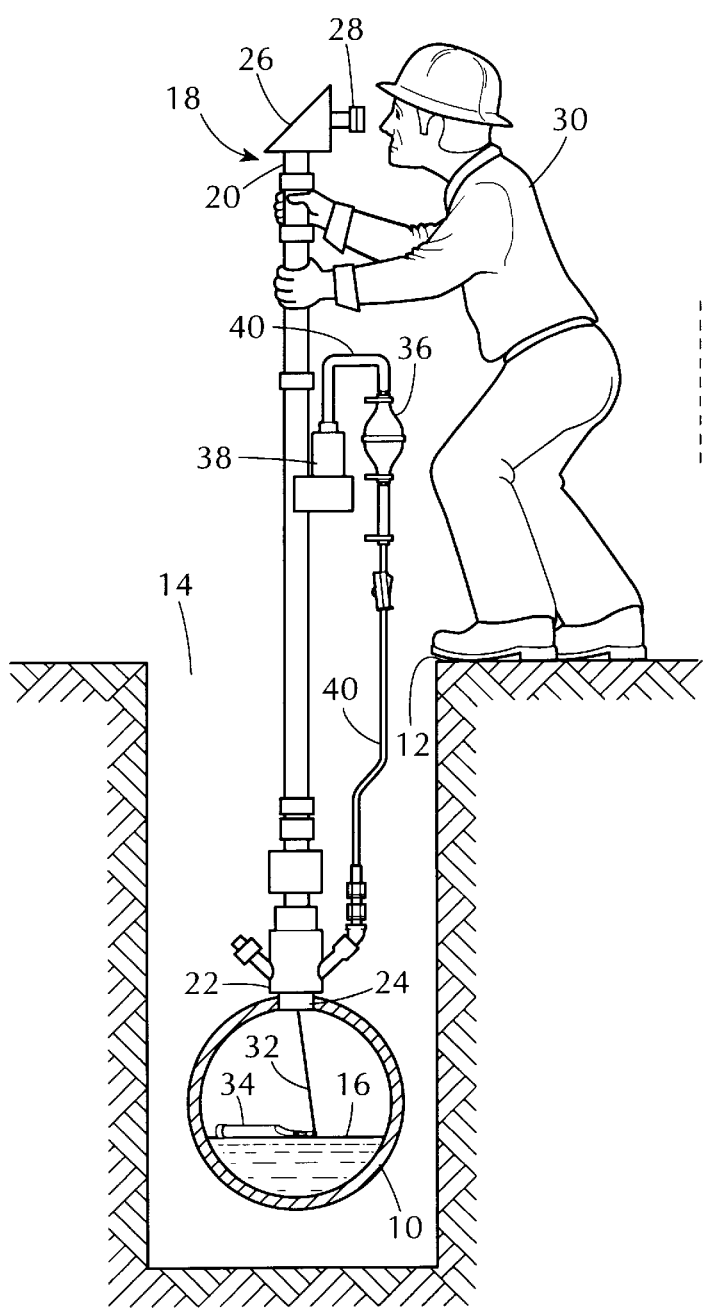
FIG. 1 is a cross-sectional view of a gas pipe being inspected, and showing a pipe inspecting apparatus according to the invention attached to the gas pipe.

As shown in FIG. 1, a generally horizontally extending gas pipe 10 to be inspected is located beneath the surface of the earth 12. Access to the pipe 10 is obtained by digging a trench 14. The gas pipe 10 normally has only gas flowing therethrough; however if there has been liquid infiltration, such as may have been caused by a crack or pipe joint leak, a certain amount of water or other liquid 16 may be present in the pipe. The water or other liquid 16 flows from a higher elevation along the pipe 10 to a lower elevation; and the source or the location of its infiltration is in the upstream direction of the liquid flow.

As can be seen in FIG. 1, there is provided an elongated inspection apparatus 18 which has a viewing end 20 and a connecting end 22. The connecting end 22 is threaded into a threaded opening 24 in the upper portion of the pipe 10 so that the inspection apparatus extends vertically up from the pipe 10 with the viewing end 20 located above the trench 14.

A right angle alignment telescope 26 is mounted to the viewing end 20 of the inspection apparatus 18 and is provided with an eyepiece 28 through which an inspector 30 may look into the interior of the pipe 10.

A line 32 extends down into the pipe 10 from the connecting end 22 of the inspection apparatus 18; and an illuminating element 34 is attached to the lower end of the line 32 so that it rests on the bottom of the pipe. The line 32 prevents the illuminating element 34 from being carried away by the flow of the liquid 16. The illuminating element 34 is preferably a chemiluminescent lighting device which contains chemicals that mix together when the device is mechanically flexed. When the chemicals are mixed, they produce a chemiluminescence for a particular length of time. A suitable chemiluminescent lighting device is commercially available under the trademark CYALUME® lightstick which is supplied by the Omniglow Corporation of Novator, Calif.

In operation of the inspection apparatus 18, the inspector 30, while viewing the interior of the pipe through the eyepiece 28, squeezes an aspirator pump 36 to force a dispersible dye or colorant from a container 38, mounted on the inspection apparatus 18, and through a colorant supply tube 40 into the interior of the pipe 10 so that it falls upon the surface of the liquid 16 and is dispersed by the flow of the liquid so that it moves in the direction of liquid flow. The illuminating element 34 illuminates the dye or colorant so that its movement can be observed by the inspector 30 viewing it through the eyepiece 28.

Figure 2:
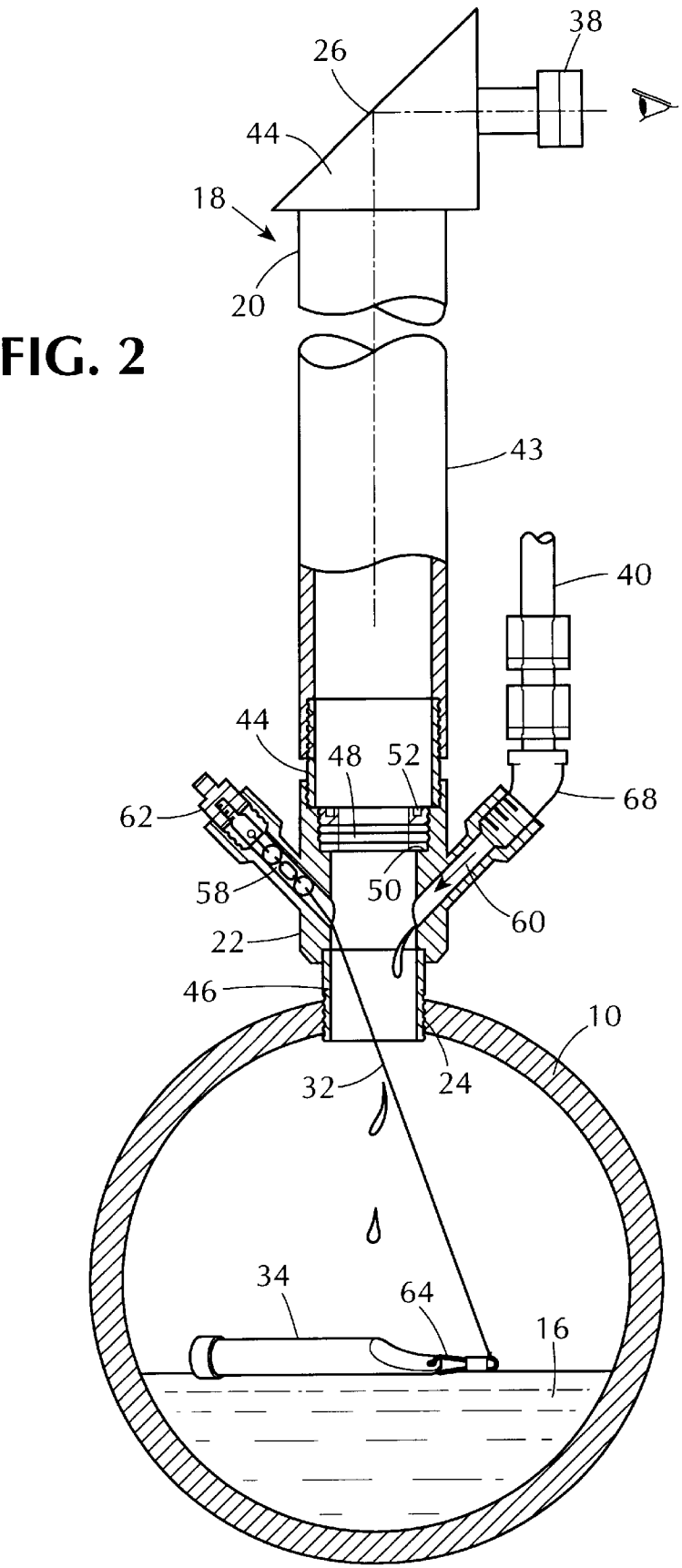
FIG. 2 is an enlarged fragmentary section view showing the internal construction of the pipe inspecting apparatus of FIG. 1.

The specific construction of the inspection apparatus 18 is best seen in FIGS. 2 and 3. As can be seen in FIG. 2, the apparatus 18 essentially comprises one or more interconnected viewing tubes 43 held in alignment by connector sleeves 44. In most cases, the viewing tubes are threaded into the respective connector sleeves; however to enable the apparatus to be easily disassembled after use, one or more of the tubes 42 may be secured to its respective connector by means of a setscrew.

At the viewing end 20 of the apparatus 18, the alignment telescope 26 is provided with a prism 44 and lens system (not shown) so that the inspector, when viewing through the eyepiece 28, may focus upon the lower region of the interior of the pipe 10.

As seen in FIGS. 2 and 3, the connector end 22 of the inspection apparatus 18 has a threaded lower connecting portion 46 which is screwed into the opening 24 in the pipe 10. A transparent seal 48, which may be glass or plastic, extends across the interior of the lower connecting portion to prevent gas in the pipe 10 from escaping up through the inspection apparatus 18. The transparent seal 48 rests on a shoulder 50 in the connecting portion 46 and is held in place by a retaining ring 52 which is screwed into the connecting portion 46 to bear down on the periphery of the transparent seal 48. Sealing gaskets 54 and 56 (FIG. 3) are provided between the transparent seal 48 and the shoulder 50 and between the transparent seal and the retaining ring 52, to prevent leakage of gas from the pipe 10.

The connecting portion 46 is also formed with two access passages 58 and 60 which open into the interior of the connecting portion below the transparent seal 48. The outer end of the first access passage 58 is fitted with a removable plug 62. The line 32 is attached to the plug 62 and extends through the passage 58 down to the bottom of the pipe 10. The lower end of the line 32 is provided with a hook connector 64 which is removably attached to the illuminating element 34. The line 32 holds the illuminating element 34 so that it remains beneath the inspection apparatus 18 and is not carried away by the flow of water or other liquid 16 along the bottom of the pipe 10. As can be seen, water or liquid 16 which has entered the pipe 10 flows over or around the illuminating element 34.

Figure 4:
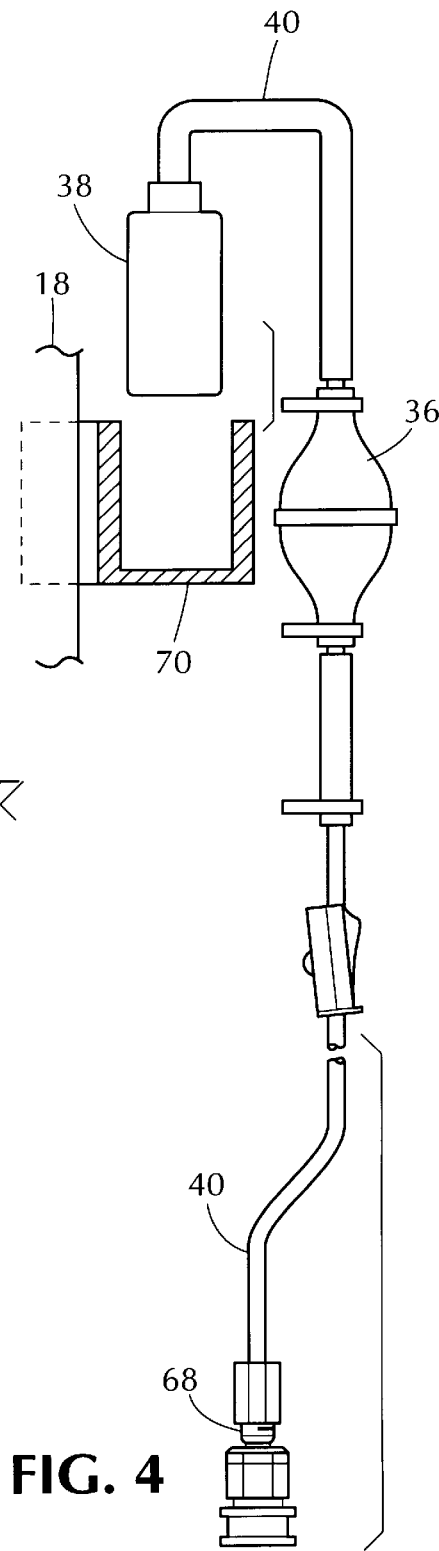
FIG. 4 is an elevational view of a dye insertion arrangement which forms a portion of the pipe inspecting arrangement of FIG. 1.

The outer end of the passageway 60 is provided with a connector 68 at the end of the colorant supply tube 40. As can be seen in FIG. 4, the colorant container 38 is held removably in a holder 70 attached to the inspection apparatus 18. The colorant supply tube 40 extends from the container 38 to the aspirator pump 36 and from the pump to the connector 68. The aspirator pump 36 is located along the tube 40 at a position where it may be easily squeezed by the operator 30. When the aspirator pump 36 is squeezed, its pumping action forces the dispersible dye or colorant 42 from the container 38 down through the tube 40. The colorant passes through the passage 60 at the lower end of the inspection apparatus 18 and through the interior of the lower connecting portion 46 below the transparent seal 48 and into the pipe 10 where it drips onto the surface of the water or liquid 16 which may be flowing along the bottom of the pipe.

The inspection apparatus 18 is used in the following manner. First, the inspection apparatus 18 is assembled by interconnecting the viewing tubes 43 via their respective connector sleeves 44. The container 38 is then filled with a dispersible dye or colorant and the connector 68 at the end of the colorant supply tube 40 is secured to the outer end of the passageway 58. Then, the illuminating element 34 is attached to the line 32 and the line is secured to the plug 60 which is then threaded into the outer end of the passageway 58. The illuminating element 34 is then secured to the other end of the line 32 and the apparatus 18 is brought to the opening 24 in the pipe 10.

In the illustrated embodiment, as shown in FIG. 5, the illuminating element 34 is generally cylindrical in shape and is flanged at one end where it is provided with a fastener hole 74 through which the hook connector 64 at the end of the line 32 may be secured.

The opening 24 in the pipe 10 being inspected may have been predrilled and provided with a threaded plug (not shown), which is removed when inspection is to take place; or the opening may be drilled and threaded at the time of inspection.

In either event, when the threaded opening 24 is opened, the inspection apparatus 18 is brought to the pipe 10 with its connecting portion 46 adjacent the opening 24. The illuminating element 34 is then flexed to initiate its chemiluminescence effect and it is inserted into the pipe 10 through the opening 24. The inspection apparatus 18 is then screwed into the opening 24 as shown in FIG. 2. As can be seen, the length of the line 32 is set such that when the inspection apparatus 18 is screwed into place, the line 32 allows the illuminating element 34 to rest on the bottom of the pipe 10 just below, and in the line of sight of, the inspection apparatus. Thus, a person may look into the eyepiece 28 and see down through the inspection apparatus 18 and into the interior of the pipe 10 so as to observe the light being produced by the illuminating element 34.

As can be seen in FIG. 6, the liquid 16 flowing in the direction of the arrow A causes the dispersible dye or colorant 42 to flow in the same direction as the liquid. Because the illuminating element 34 is under or adjacent the moving dye or colorant 42, the dye or colorant becomes illuminated and its movement can easily be observed by sighting through the eyepiece 28 of the inspection apparatus 18.

It will be appreciated that there has been described a method and apparatus which permits easy and accurate assessment of the presence and direction of flow of liquids within a submerged gas pipe.

Various modifications of the above described method an apparatus are possible within the spirit and scope of the invention. For example, other types of illuminating element may be employed; other means for securing the illuminating element under the observation location may be employed; different means may be used for supplying the dye or colorant to a location below the observation location and different arrangements may be used for sighting into the interior of the pipe 10.

I claim:

1. A method for inspecting the interior of a pipe, said method comprising the steps of:

inserting a light emitting element into said pipe;

retaining said light emitting element at a given location inside said pipe; and visually observing the interior of the pipe through an opening in its wall which is aligned with said given location;

wherein a dispersible colorant is injected into said pipe at said given location.

2. A method according to claim 1 wherein said light emmiting element is retained by a line that is fixed to said pipe.

3. A method according to claim 1, wherein said light emitting element is inserted through an opening in said pipe at said given location.

4. A method of observing the presence of liquid at a given location in a pipe, said method comprising the steps of:

injecting into said pipe at said given location, a colorant which is dispersible in said liquid; and visually observing said colorant through an opening in the wall of said pipe at said given location.

5. A method according to claim 4, wherein a light emitting element is positioned within said pipe at said given location.

6. A method according to claim 4, wherein said colorant is inserted into said pipe through a passageway that is sealed from an observation apparatus.

7. A method for ascertaining the presence of liquid in a pipe, said method comprising the steps of:

inserting a light emitting element into said pipe through its wall;

injecting a dispersible colorant into said pipe at the location of said light emitting element so that said light emitting element illuminates said colorant; and visually observing said colorant as it is dispersed by any liquid in the pipe.

8. A method according to claim 7, wherein said light emitting element is inserted through a passage in an observation apparatus below a seal which prevents gas in said pipe from leaking into said inspection apparatus.

9. A method according to claim 7, wherein said colorant is inserted through a passage in an observation apparatus below a seal which prevents gas in said pipe from leaking into said inspection apparatus.

10. A method according to claim 9, wherein said colorant is injected from a container by means of an aspirator pump.

11. Apparatus for observing the presence of liquid in a pipe, said apparatus comprising:

a colorant injection system for injecting a dispersible colorant into said pipe at a given location therein; and visual observation means extending through an opening in the wall of said pipe at said given locations;

said visual observation means comprising a viewing tube with a connecting end which can be fitted into an opening in a pipe wall.

12. Apparatus according to claim 11, wherein said colorant injection system includes a container which contains a colorant fluid, a tube extending from said container for insertion into an opening in a pipe and a pump for pumping colorant fluid from said container into said pipe.

13. Apparatus according to claim 12, wherein said pump is an aspirator pump arranged along said tube.

14. Apparatus according to claim 11, wherein said viewing tube has a transparent seal extending across its interior near its connecting end to permit observation of the interior of said pipe without allowing gas to leak out from said pipe.

15. Apparatus according to claim 14, wherein said colorant injection system is arranged to inject colorant fluid into said viewing tube at a location between said seal and said connecting end.

16. Apparatus for inspecting the interior of a pipe, said apparatus comprising:
    an illuminating element;
    means for retaining said illuminating element at a given location inside said pipe; and
    visual observation means extending through an opening in the wall of said pipe at said given location;
    wherein said illuminating element is a chemiluminescence device.

17. Apparatus according to claim 16, wherein said observation means comprises a viewing tube having a connecting end which can be fitted into an opening in a pipe wall.

18. Apparatus according to claim 17, wherein said illuminating element is attached to a line which extends into said viewing tube through its connecting end so that the length of said line can be adjusted.

19. Apparatus according to claim 18, wherein said viewing tube includes a transparent seal which permits viewing into the interior of a pipe without gas leaking from said pipe and wherein said line extends through an opening in said viewing tube between said seal and the connecting end of said viewing tube.

20. Apparatus for detecting the presence of liquid in a pipe, said apparatus comprising:
    a viewing tube having a viewing end and a pipe connecting end which is insertable through the wall of a pipe to be inspected;
    an illuminating element suspended from the pipe connecting end of said viewing tube; and
    a colorant injection system for injecting a dispersible colorant into said pipe at the location of said illuminating elements;
    said colorant injection system including a container which contains a colorant fluid, a tube extending from said container for insertion into an opening in a pipe and a pump for pumping colorant fluid from said container into said pipe.

21. Apparatus according to claim 20, wherein said pump is an aspirator pump arranged along said tube.

22. Apparatus according to claim 20, wherein said illuminating element is attached to a line which extends into said viewing tube through its connecting end so that the length of said line can be adjusted.

23. Apparatus according to claim 22, wherein said viewing tube includes a transparent seal which permits viewing into the interior of a pipe without gas leaking from said pipe and wherein said line extends through an opening in said viewing tube between said seal and the connecting end of said viewing tube.

24. Apparatus for inspecting the interior of a pipe, said apparatus comprising:
    an illuminating element;
    means for retaining said illuminating element at a given location inside a pipe; and
    visual observation means configured to extend through an opening in the wail of a pipe at said given location;
    said means for retaining said illuminating element comprising a line attached at one end to said observation means.

25. Apparatus according to claim 24, wherein said visual observation means comprises a viewing tube having a connecting end which can be fitted into an opening in a pipe wall.

26. Apparatus according to claim 25, wherein said illuminating element is attached to a line which extends into said viewing tube through its connecting end so that the length of said line can be adjusted.

27. Apparatus according to claim 26, wherein said viewing tube includes a transparent seal which permits viewing into the interior of a pipe without gas leaking from said pipe and wherein said line extends through an opening in said viewing tube between said seal and the connecting end of said viewing tube.

28. Apparatus for detecting the presence of liquid in a pipe, said apparatus comprising:
    a viewing tube having a viewing end and a pipe connecting end which is insertable through the wall of a pipe to be inspected;
    an illuminating element suspended from the pipe connecting end of said viewing tube; and
    a colorant injection system for injecting a dispersible colorant into a pipe at the location of said illuminating element;
    said viewing tube having a transparent seal extending across its interior near its connecting end to permit observation of the interior of a pipe without allowing gas to leak out from said pipe.

29. Apparatus according to claim 28, wherein said colorant injection system is arranged to inject colorant fluid into said viewing tube at a location between said seal and said connecting end.

30. Apparatus according to claim 28, wherein said colorant injection system is arranged to inject colorant fluid into said viewing tube at a location between said seal and said connecting end.

31. Apparatus for detecting the presence of liquid in a pipe, said apparatus comprising:
    a viewing tube having a viewing end and a pipe connecting end which is insertable through the wall of a pipe to be inspected;
    an illuminating element suspended from the pipe connecting end of said viewing tube; and
    a colorant injection system for injecting a dispersible colorant into a pipe at the location of said illuminating element;
    wherein said illuminating element is a chemiluminescence device.

32. Apparatus for detecting the presence of liquid in a pipe, said apparatus comprising:
    a viewing tube having a viewing end and a pipe connecting end which is insertable through the wall of a pipe to be inspected;

an illuminating element suspended from the pipe connecting end of said viewing tube; and a colorant injection system for injecting a dispersible colorant into a pipe at the location of said illuminating element;

wherein said illuminating element is suspended by means of a line attached at one end to said illuminating element and at the other end to said viewing tube.

33. Apparatus according to claim 32, wherein said illuminating element is attached to a line which extends into said viewing tube through its connecting end so that the length of said line can be adjusted.

34. Apparatus according to claim 33, wherein said viewing tube includes a transparent seal which permits viewing into the interior of a pipe without gas leaking from said pipe and wherein said line extends through an opening in said viewing tube between said seal and the connecting end of said viewing tube.

\* \* \* \* \*

UNITED STATES PATENT AND TRADEMARK OFFICE
CERTIFICATE OF CORRECTION

PATENT NO. : 5 983 736

DATED : NOVEMBER 16, 1999

INVENTOR(S) : ALBERT W. GERSHMAN

It is certified that error appears in the above-identified patent and that said Letters Patent is hereby corrected as shown below:

```
Title Page - [56] - FOREIGN PATENT DOCUMENTS,
             "0075257" should read --61-75257--; and
             "406094741" should read --6-94741--;

Column 2, line 62, "dispensable" should read --dispersible--;
Column 2, line 65, "dispensable" should read --dispersible--;
Column 3, line 3, "dispensable" should read --dispersible--;
Column 3, line 11, "dispensable" should read --dispersible--;
Column 6, line 5, "an" should read --and--;
Column 6, line 26, "emmiting" should read --emitting--;
Column 7, line 53, "elements;" should read --element;--.
```

Signed and Sealed this

Fifteenth Day of August, 2000

*Attest:*

Q. TODD DICKINSON

*Attesting Officer*     *Director of Patents and Trademarks*